(12) United States Patent
Hosomi

(10) Patent No.: US 11,803,768 B2
(45) Date of Patent: Oct. 31, 2023

(54) HYPOTHESIS VERIFICATION APPARATUS, HYPOTHESIS VERIFICATION METHOD, AND COMPUTER-READABLE RECORDING MEDIUM

(71) Applicant: NEC CORPORATION, Tokyo (JP)

(72) Inventor: Itaru Hosomi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 807 days.

(21) Appl. No.: 16/651,183

(22) PCT Filed: Sep. 29, 2017

(86) PCT No.: PCT/JP2017/035747
§ 371 (c)(1),
(2) Date: Mar. 26, 2020

(87) PCT Pub. No.: WO2019/064600
PCT Pub. Date: Apr. 4, 2019

(65) Prior Publication Data
US 2020/0272916 A1   Aug. 27, 2020

(51) Int. Cl.
*G06N 5/04* (2023.01)
*G06N 5/01* (2023.01)

(52) U.S. Cl.
CPC ............ *G06N 5/041* (2013.01); *G06N 5/013* (2023.01)

(58) Field of Classification Search
CPC .............................. G06N 5/041; G06N 5/006
See application file for complete search history.

(56) References Cited

U.S. PATENT DOCUMENTS

2015/0286951 A1* 10/2015 Rigdon ................. G06N 5/04
706/52
2020/0118013 A1* 4/2020 Yamamoto ............ G06N 5/046
(Continued)

FOREIGN PATENT DOCUMENTS

CN   102104609 B * 6/2013
CN   104135397 A * 11/2014
(Continued)

OTHER PUBLICATIONS

International Preliminary Report on Patentability with the translation of Written Opinion dated Apr. 9, 2020, issued by the International Bureau in International Application No. PCT/JP2017/035747.
(Continued)

*Primary Examiner* — Paulinho E Smith

(57) ABSTRACT

An extracted hypothesis has logical formulas leading to a possible conclusion. If the logical formulas include one including a first parameter a value obtained from observation data and a second parameter that does not have a value obtained from the observation data, the logical formula is set as a target logical formula, and a value of the second parameter acquired based on the observation data is input. If there is no such logical formula, but there is a logical formula that has, for one or more parameters, a value set in advance or obtained using inference knowledge, whether this logical formula is true or false is determined. When whether the logical formula is true or false is determined, or, when the value of the second parameter is input, the logical formula is added to the observation data, and a hypothesis is derived again.

9 Claims, 11 Drawing Sheets

(56) References Cited

U.S. PATENT DOCUMENTS

2020/0250551 A1* 8/2020 Nemoto .................. G06N 5/046
2020/0272916 A1* 8/2020 Hosomi .................. G06N 5/006

FOREIGN PATENT DOCUMENTS

| CN | 105426176 A | * | 3/2016 | |
|----|----|----|----|----|
| CN | 104135397 B | * | 4/2018 | |
| DE | 602005004997 T2 | * | 7/2008 | ......... G05B 23/0248 |
| JP | 06-508949 A | | 10/1994 | |
| JP | 07-129406 A | | 5/1995 | |
| JP | 2005141568 A | * | 6/2005 | |
| JP | 2016-091039 A | | 5/2016 | |
| JP | 2018147042 A | * | 9/2018 | |
| WO | WO-2018229877 A1 | * | 12/2018 | |

OTHER PUBLICATIONS

Jerry R. Hobbs, et al., "Interpretation as Abduction", Artificial Intelligence, 1993, pp. 69-142, vol. 63, Nos. 1-2.

Kazeto Yamamoto, et al., "Backpropagation Learning for Weighted Abduction", IPSJ SIG Technical Report, Jun. 15, 2012, pp. 1-8, vol. 2012-NL206, No. 9.

International Search Report for PCT/JP2017/035747 dated Dec. 12, 2017 [PCT/ISA/210].

Written Opinion for PCT/JP2017/035747 dated Dec. 12, 2017 [PCT/ISA/237].

* cited by examiner

Fig.3

| LOGICAL FORMULA INCLUDED IN INPUT DATA | CONCLUSION |
|---|---|
| file(FILE, TYPE) | malware_found(NAME) |
| file(FILE, TYPE) | has_personal_info(DATA) |
| packet(PAC) | malware_found(NAME) |
| packet(PAC) | has_personal_info(DATA) |
| url(URL) | malware_found(NAME) |

SPECIFIC EXAMPLE OF OPERATION

HYPOTHESIS VERIFICATION APPARATUS, HYPOTHESIS VERIFICATION METHOD, AND COMPUTER-READABLE RECORDING MEDIUM

CROSS REFERENCE TO RELATED APPLICATIONS

This application is a National Stage of International Application No. PCT/JP2017/035747 filed Sep. 29, 2017.

TECHNICAL FIELD

The invention relates to a hypothesis verification apparatus, a hypothesis verification method, and a program that realizes them, and in particular relates to a hypothesis verification apparatus, a hypothesis verification method, and a program for substantiating a process by setting a hypothesis of a process that leads to a certain result, and verifying the set hypothesis.

BACKGROUND ART

Techniques called abductive inference or abduction are known as conventional types of logical inference. Abductive inference is a technique for selecting a hypothesis that can best explain related facts obtained with respect to, for example, an abnormal state that has occurred in an object, a manufacturing system, a software program that is being executed, or the like, from among hypotheses that are based on several possibilities that lead to the state.

Commonly, in abductive inference, a hypothesis is generated or selected, but in most actual usage situations, the hypothesis needs to be verified, and correction or reselection according to the verification result is required. Here, an example of a system in which abductive inference is used for a real problem will be described based on Patent Document 1. Patent Document 1 discloses a driving assistance system that uses abductive inference.

The driving assistance system disclosed in Patent Document 1 predicts a danger that may occur while a vehicle is being driven, using information obtained through observation of the surroundings. In the driving assistance system disclosed in Patent Document 1, weighted abductive inference (see Non-patent Document 1), which is a type of abductive inference, is used.

Specifically, as shown in FIG. 13 of Patent Document 1, the driving assistance system disclosed in Patent Document 1 first accepts, as observation data, an observation (an observation is a conjunction of first-order logic literals) with a cost obtained by converting observation information. Next, in the driving assistance system disclosed in Patent Document 1, an abductive inference unit selects the least-costly proof with the lowest proving cost, as a danger that is most likely to occur, from among hypotheses that represent a danger, based on the observation data. Subsequently, the driving assistance system disclosed in Patent Document 1 executes physical simulation on an object related to the selected least-costly proof (danger), presumes its behavior, and adds the presumption result as a new observation to the abductive inference unit. The abductive inference unit then executes abductive inference again. In this manner, according to the driving assistance system disclosed in Patent Document 1, danger prediction in which the behavior of an object in a physical simulation is taken into consideration is possible.

LIST OF RELATED ART DOCUMENTS

Patent Document

Patent Document 1: Japanese Patent Laid-Open Publication No. 2016-91039

Non-Patent Document

Non-Patent Document 1: Hobbs, Jerry R., Mark Stickel, Douglas Appelt, and Paul Martin, "Interpretation as Abduction", Artificial Intelligence, Vol. 63, Nos. 1-2, pp. 69-142, 1993.

SUMMARY OF INVENTION

Problems to be Solved by the Invention

Incidentally, in the driving assistance system disclosed in Patent Document 1, abductive inference and physical simulation are used based on obtained observation information, and thus it is conceivable that a danger that may occur can be predicted with high probability, but this system only performs prediction. In the driving assistance system disclosed in Patent Document 1, it is difficult to clarify the reason for the occurrence of an event that has actually occurred. Specifically, physical simulation that is performed in the driving assistance system disclosed in Patent Document 1 can provide information that is not included in the observation information obtained first, and although a danger predicted using the information may change, all of the evidence and details when the danger becomes a reality are not disclosed.

Therefore, the driving assistance system disclosed in Patent Document 1 has a problem in that, when abductive inference is applied to a certain problem, an obtained hypothesis cannot be verified and cannot be corrected based on the verification result.

In other words, conventional abductive inference techniques only aim to generate a better hypothesis. Thus, in conventional abductive inference, a procedure for verifying a generated hypothesis (where to start the procedure, and what procedure is to be adopted for the verification), measures to be taken when inconsistency arises in the hypothesis as a result of the verification, and comparison with another hypothesis (whether or not another hypothesis provides a better result) are not taken into consideration. Therefore, if only conventional abductive inference is used, it is impossible to obtain a result that is the best ultimate verification or is all proven.

An example object of the invention is to provide a hypothesis verification apparatus, a hypothesis verification method, and a computer-readable recording medium that can resolve the above-described issues, verify a hypothesis, and correct the hypothesis based on the verification result.

Means for Solving the Problems

In order to achieve the aforementioned example object, a hypothesis verification apparatus according to an example aspect of the invention includes:

a hypothesis generation unit configured to derive, from observation data expressed by a set of logical formulas each including one name and one or more parameters, a hypothesis made up of the logical formulas that lead to a possible conclusion, using knowledge data expressed in the same format as the observation data; and a hypothesis verification unit configured to, if the logical formulas that make up the hypothesis include a logical formula that includes a first parameter that has a value obtained from the observation data and a second parameter that does not have a value obtained from the observation data, set the logical formula as a target logical formula, acquire a value of the second parameter based on the observation data and a name of the target logical formula, and input the obtained value of the second parameter to the target logical formula, and if, conversely, there is no logical formula that is to be set as the target logical formula, and if there is a logical formula that has, for one or more parameters, a value set in advance or a value obtained using inference knowledge, determine whether this logical formula is true or false, and when determination as to whether the logical formula is true or false is performed, or, when the value of the second parameter is input to the target logical formula, the hypothesis generation unit adds the logical formula subjected to true-or-false determination or the target logical formula to the observation data, and derives a hypothesis again.

Also, in order to achieve the aforementioned example object, a hypothesis verification method according to an example aspect of the invention includes:

(a) a step of deriving, from observation data expressed by a set of logical formulas each including one name and one or more parameters, a hypothesis made up of the logical formulas that lead to a possible conclusion, using knowledge data expressed in the same format as the observation data;

(b) a step of, if the logical formulas that make up the hypothesis include a logical formula that includes a first parameter that has a value obtained from the observation data and a second parameter that does not have a value obtained from the observation data, setting the logical formula as a target logical formula, acquiring a value of the second parameter based on the observation data and a name of the target logical formula, and inputting the obtained value of the second parameter to the target logical formula, and if, conversely, there is no logical formula that is to be set as the target logical formula, and if there is a logical formula that has, for one or more parameters, a value set in advance or a value obtained using inference knowledge, determining whether this logical formula is true or false; and (c) a step of, when determination as to whether the logical formula is true or false is performed, or, when the value of the second parameter is input to the target logical formula, adding the logical formula subjected to true-or-false determination or the target logical formula to the observation data, and deriving a hypothesis again.

Furthermore, in order to achieve the aforementioned example object, a computer-readable recording medium according to an example aspect of the invention includes a program recorded thereon, the program including instructions that cause a computer to carry out:

(a) a step of deriving, from observation data expressed by a set of logical formulas each including one name and one or more parameters, a hypothesis made up of the logical formulas that lead to a possible conclusion, using knowledge data expressed in the same format as the observation data;

(b) a step of, if the logical formulas that make up the hypothesis include a logical formula that includes a first parameter that has a value obtained from the observation data and a second parameter that does not have a value obtained from the observation data, setting the logical formula as a target logical formula, acquiring a value of the second parameter based on the observation data and a name of the target logical formula, and inputting the obtained value of the second parameter to the target logical formula, and if, conversely, there is no logical formula that is to be set as the target logical formula, and if there is a logical formula that has, for one or more parameters, a value set in advance or a value obtained using inference knowledge, determining whether this logical formula is true or false; and (c) a step of, when determination as to whether the logical formula is true or false is performed, or, when the value of the second parameter is input to the target logical formula, adding the logical formula subjected to true-or-false determination or the target logical formula to the observation data, and deriving a hypothesis again.

Advantageous Effects of the Invention

As described above, according to the present invention, a hypothesis can be verified, and can be corrected based on the verification result.

BRIEF DESCRIPTION OF THE DRAWINGS

FIG. 3 is a diagram showing an example of data stored in a conclusion storage unit in an example embodiment of the invention.

EXAMPLE EMBODIMENT (Premise of Invention)

First, examples of a logical formula that is used in the invention include one functional logical formula made up of one predicate and one or more terms. For example, a logical formula showing that a X is a child of a Y can be written as child (X, Y). Also, one hypothesis is made up of one or more rules written as logical formulas. One rule can be written as "A→B" using logical formulas A and B. "→" is a symbol indicating the meaning that, if the left side (also referred to as "antecedent") holds true, the right side (also referred to as "consequent") holds true.

Example Embodiment

A hypothesis verification apparatus in an example embodiment of the invention will be described below with reference to FIGS. 1 to 6.

[Apparatus Configuration]

Figure 1:
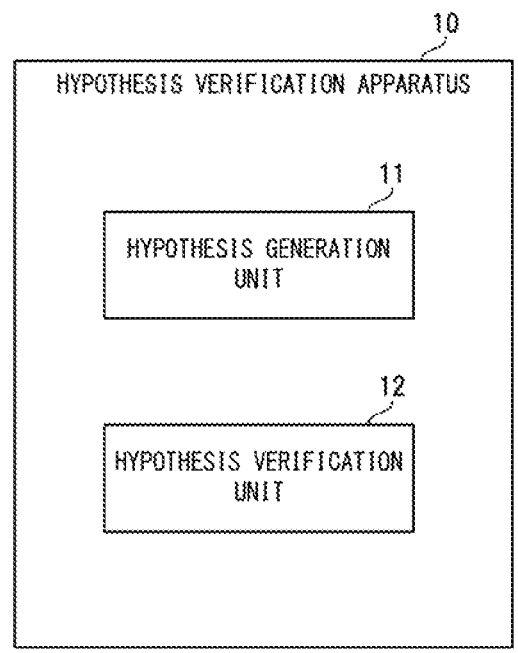
FIG. 1 is a block diagram showing a schematic configuration of a hypothesis verification apparatus in an example embodiment of the invention.

First, a schematic configuration of the hypothesis verification apparatus in this example embodiment will be described with reference to FIG. 1. FIG. 1 is a block diagram showing a schematic configuration of the hypothesis verification apparatus in an example embodiment of the invention.

As shown in FIG. 1, a hypothesis verification apparatus 10 in this example embodiment includes a hypothesis generation unit 11 and a hypothesis verification unit 12.

The hypothesis generation unit 11 derives a hypothesis made up of logical formulas that lead to a possible conclusion, from observation data expressed as a set of logical formulas each including one name and one or more parameters, using knowledge data expressed in the same format as the observation data.

If the logical formulas that make up the hypothesis include a logical formula including a first parameter that has a value obtained from the observation data and a second parameter that does not have a value obtained from the observation data, the hypothesis verification unit 12 sets this logical formula as a target logical formula. The hypothesis verification unit 12 then acquires the value of the second parameter based on the observation data and the name of the target logical formula. Furthermore, in this case, the hypothesis verification unit 12 inputs the obtained value of the second parameter to the target logical formula.

In addition, if there is no logical formula that is to be set as a target logical formula, and if there is a logical formula that has, for one or more parameters, a value that has been set in advance or a value obtained using inference knowledge, the hypothesis verification unit 12 determines whether the latter logical formula is true or false.

Then, when the hypothesis verification unit 12 determines whether the logical formula is true or false, or when the value of the second parameter is input to the target logical formula, the hypothesis generation unit 11 adds the logical formula subjected to true-or-false determination or the target logical formula to the observation data, and derives a hypothesis again.

In this manner, in this example embodiment, a hypothesis is derived again using the result of true-or-false determination of a logical formula that makes up the hypothesis, or a logical formula to which a new value of a parameter is added. Therefore, according to this example embodiment, a hypothesis can be verified, and can be corrected based on the verification result.

Figure 2:
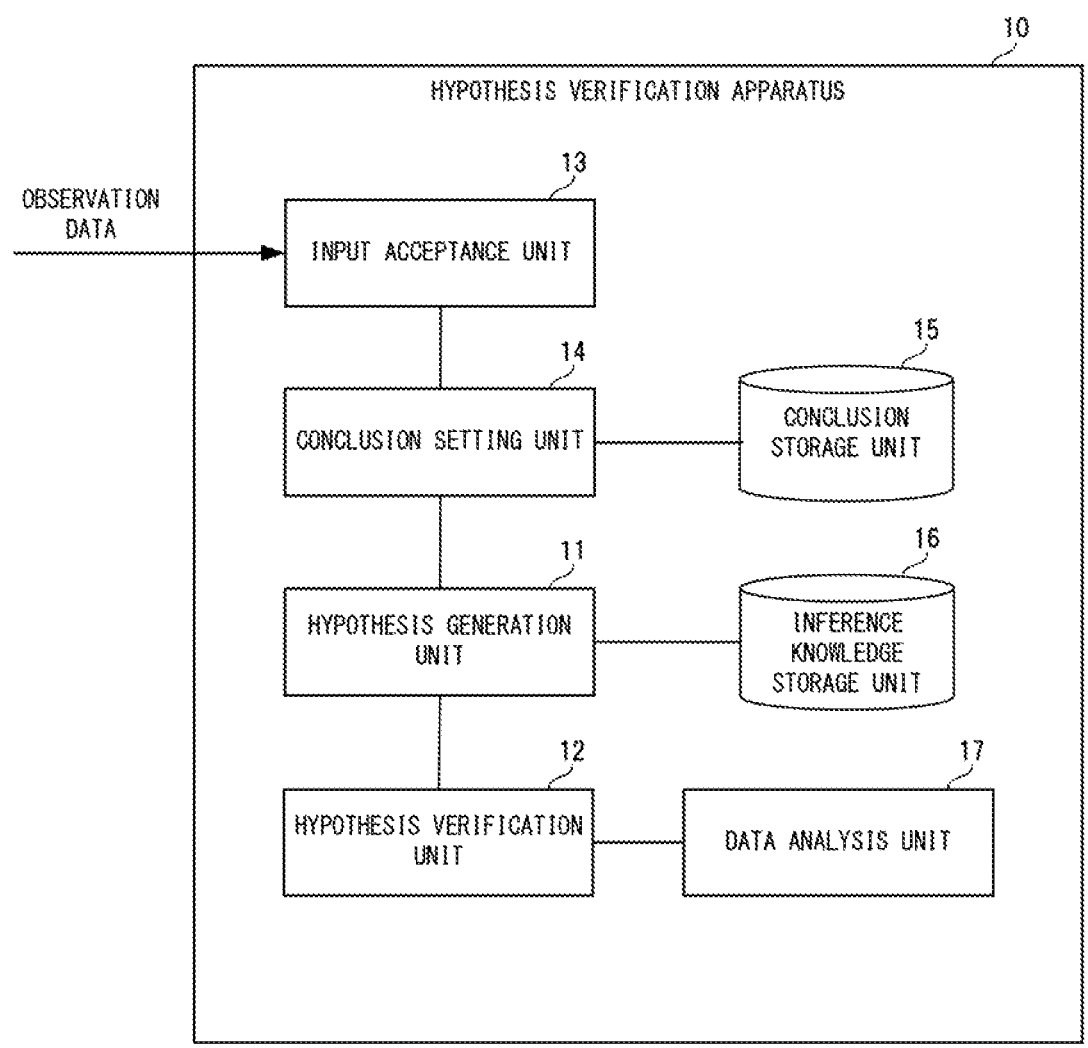
FIG. 2 is a block diagram specifically showing a configuration of the hypothesis verification apparatus in an example embodiment of the invention.

Next, the configuration of the hypothesis verification apparatus 10 in this example embodiment will be described in more detail with reference to FIG. 2. FIG. 2 is a block diagram showing the configuration of the hypothesis verification apparatus in an example embodiment of the invention in detail.

As shown in FIG. 2, the hypothesis verification apparatus 10 in this example embodiment includes an input acceptance unit 13, a conclusion setting unit 14, a conclusion storage unit 15, an inference knowledge storage unit 16, and a data analysis unit 17, in addition to the above-described hypothesis generation unit 11 and hypothesis verification unit 12.

The input acceptance unit 13 accepts input of observation data from the outside. In addition, in this example embodiment, observation data is data that has, for all of the parameters, values obtained by observing an event targeted for inference, and is expressed in the format of a logical formula. The input acceptance unit 13 passes the accepted observation data to the conclusion setting unit 14.

The conclusion setting unit 14 collates observation data using the conclusion storage unit 15, and sets a conclusion corresponding to the observation data. Also, the set conclusion is used as a starting point of abductive inference. The conclusion storage unit 15 is a database in which conclusions are registered in advance for respective logical formulas. FIG. 3 is a diagram showing an example of data stored in the conclusion storage unit, in an example embodiment of the invention. As shown in FIG. 3, conclusions that are set for respective logical formulas are registered in the conclusion storage unit 15.

Figure 4:
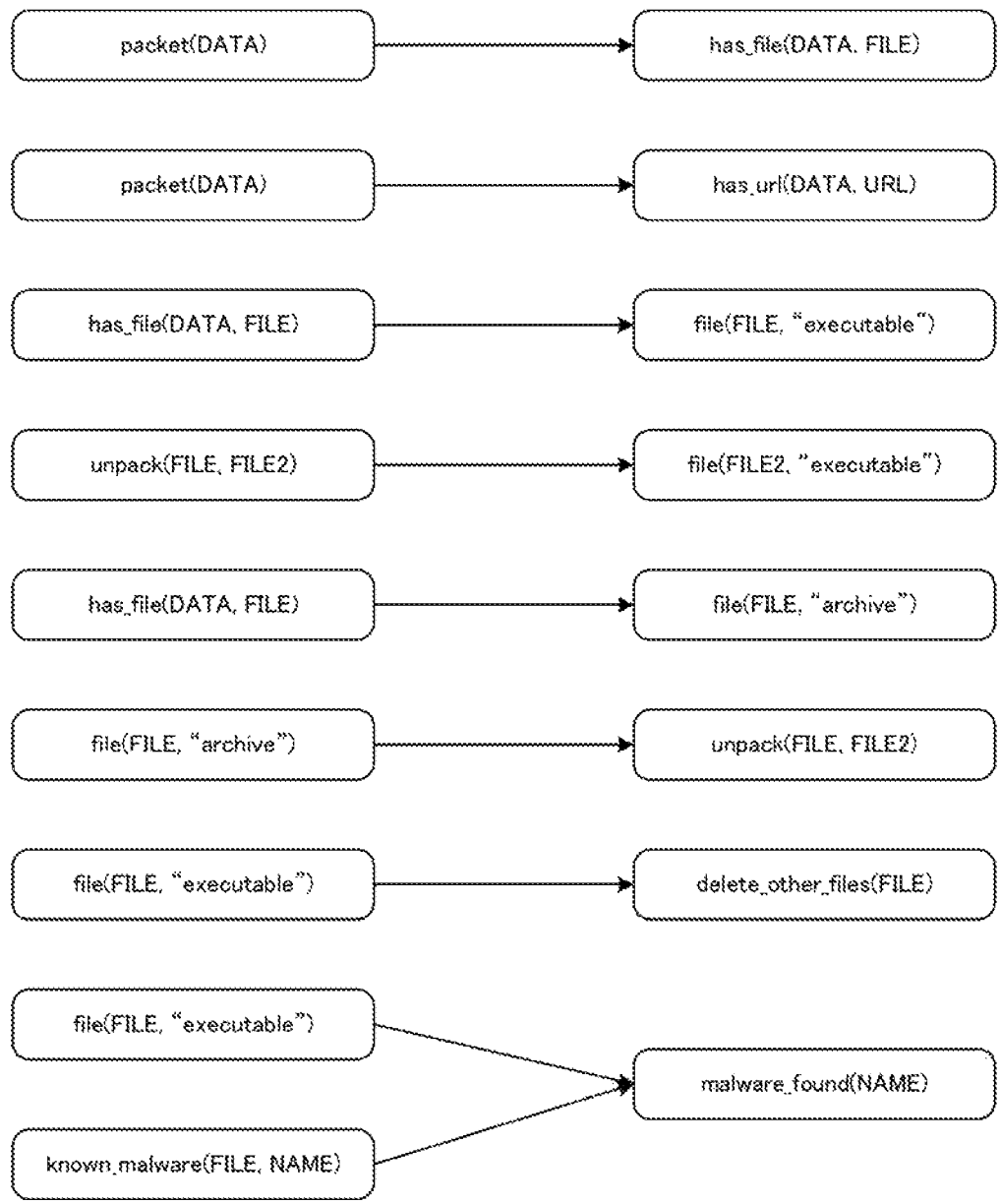
FIG. 4 is a diagram showing an example of knowledge data that is used in an example embodiment of the invention.

The inference knowledge storage unit 16 stores knowledge data used when the hypothesis generation unit 11 derives a hypothesis. FIG. 4 is a diagram showing an example of knowledge data used in an example embodiment of the invention. As shown in FIG. 4, in this example embodiment, knowledge data is inference knowledge.

In this example embodiment, the hypothesis generation unit 11 performs abductive inference using observation data, a conclusion set by the conclusion setting unit 14, and inference knowledge stored in the inference knowledge storage unit 16, and derives a hypothesis. Weighed abductive inference that is used in Patent Document 1 above as well is an example of a abductive inference technique.

Specifically, the hypothesis generation unit 11 selects a piece of inference knowledge that results in a conclusion set by the conclusion setting unit 14 from among pieces of inference knowledge stored in the inference knowledge storage unit 16, and adds the observation data to the selected piece of inference knowledge. Accordingly, candidate hypotheses are created respectively for selected pieces of inference knowledge. Next, the hypothesis generation unit 11 calculates costs respectively for the created candidate hypotheses using a cost given to the observation data and weights provided for the respective pieces of inference knowledge, and derives a candidate hypothesis with the lowest cost as a hypothesis.

The data analysis unit 17 registers the name of each logical formula and an analysis tool that can extract the value of a parameter included in the logical formula in association with each other. Then, when the name of a logical formula and the observation data, or the name of a logical formula and the value of a first parameter are input, the data analysis unit 17 executes an analysis tool according to the input.

In addition, examples of an analysis tool that can be used in this example embodiment include various known file analysis tools provided by application programs (including Web application programs).

In this example embodiment, the hypothesis verification unit 12 inputs the observation data and the name of a target logical formula to the data analysis unit 17, and thereby determines whether the target logical formula is true or false, or acquires the value of the second parameter.

Specifically, in this example embodiment, the hypothesis verification unit 12 first determines whether or not the logical formulas that make up the hypothesis include a logical formula (target logical formula) that has two or more parameters of which only one or more parameters (first parameter) have a value.

As a result of the determination, if there is a target logical formula that satisfies the condition, the hypothesis verification unit 12 sets this as a search query. Next, the hypothesis verification unit 12 performs search processing on the analysis tools registered by the data analysis unit 17, using the search query, and specifies an analysis tool applicable to the search query from among these analysis tools. Next, the hypothesis verification unit 12 causes the data analysis unit 17 to execute the specified analysis tool, and acquire the value of the second parameter from the value of the first parameter of the target logical formula.

On the other hand, as a result of above-described determination, if there is no target logical formula that satisfies the condition, the hypothesis verification unit 12 determines whether a logical formula that has, for one or more parameters, a value set in advance or a value obtained using inference knowledge is true or false as described above, under the condition that this logical formula exists.

For example, true-or-false determination can be performed as follows. An analysis tool is executed on a parameter that has a value set in advance, so as to acquire a value. If the acquired value is the same as the value set for the parameter in advance, the determination is true, and if it is different, the determination is false. Alternatively, an analysis tool is executed, and if it is determined that a logical formula that has a value obtained using inference knowledge holds true, the determination is true, and if it is determined that the logical formula does not hold true, the determination is false. In addition, an analysis tool in this case is searched for by using, as a search query, a logical formula that has, for one or more parameters, a value set in advance or a value obtained using inference knowledge.

In addition, if the value of the second parameter is acquired by the hypothesis verification unit 12, the hypothesis generation unit 11 inputs the value that was acquired, as a value obtained by observing an event, to the second parameter of the target logical formula. The hypothesis generation unit 11 then adds the target logical formula to which the value has been input, to the observation data, and derives a hypothesis again from the observation data to which the target logical formula has been added.

On the other hand, when true-or-false determination of the target logical formula is performed by the hypothesis verification unit 12, the hypothesis generation unit 11 reflects the result of the true-or-false determination in a logical formula targeted for determination. For example, if the determination is true, the logical formula targeted for determination is not changed, and, if the determination is false, a value obtained by executing analysis data is substituted in a parameter of the logical formula targeted for determination for which a value has been set in advance, and the logical formula in which the value has been substituted is defined as a new logical formula. Alternatively, the hypothesis generation unit 11 may provide a negation operator to a logical formula determined to be false. Specifically, in assignment of a negation operator, for example, "!" is provided to the beginning of "file(foo.rar,"executable")", and "!file(foo.rar, "executable")" is set as observation data. The hypothesis generation unit 11 then adds the logical formula in which the result of true-or-false determination is reflected, to the observation data, and derives a hypothesis again from the observation data to which the logical formula has been added.

In this example embodiment, in this manner, verification by the hypothesis verification unit 12 and derivation of a hypothesis by the hypothesis generation unit 11 are performed repeatedly. When there is no analysis tool applicable to any of the logical formulas that make up a hypothesis, in other words, when all of the logical formulas that make up a hypothesis have values for all of the parameters, the hypothesis generation unit 11 outputs this hypothesis as a final hypothesis. Such a hypothesis made up of only logical formulas that have values for all of the parameters is fully verified, and accordingly, it can be said that this hypothesis is a proven hypothesis.

[Apparatus Operations]

Figure 5:
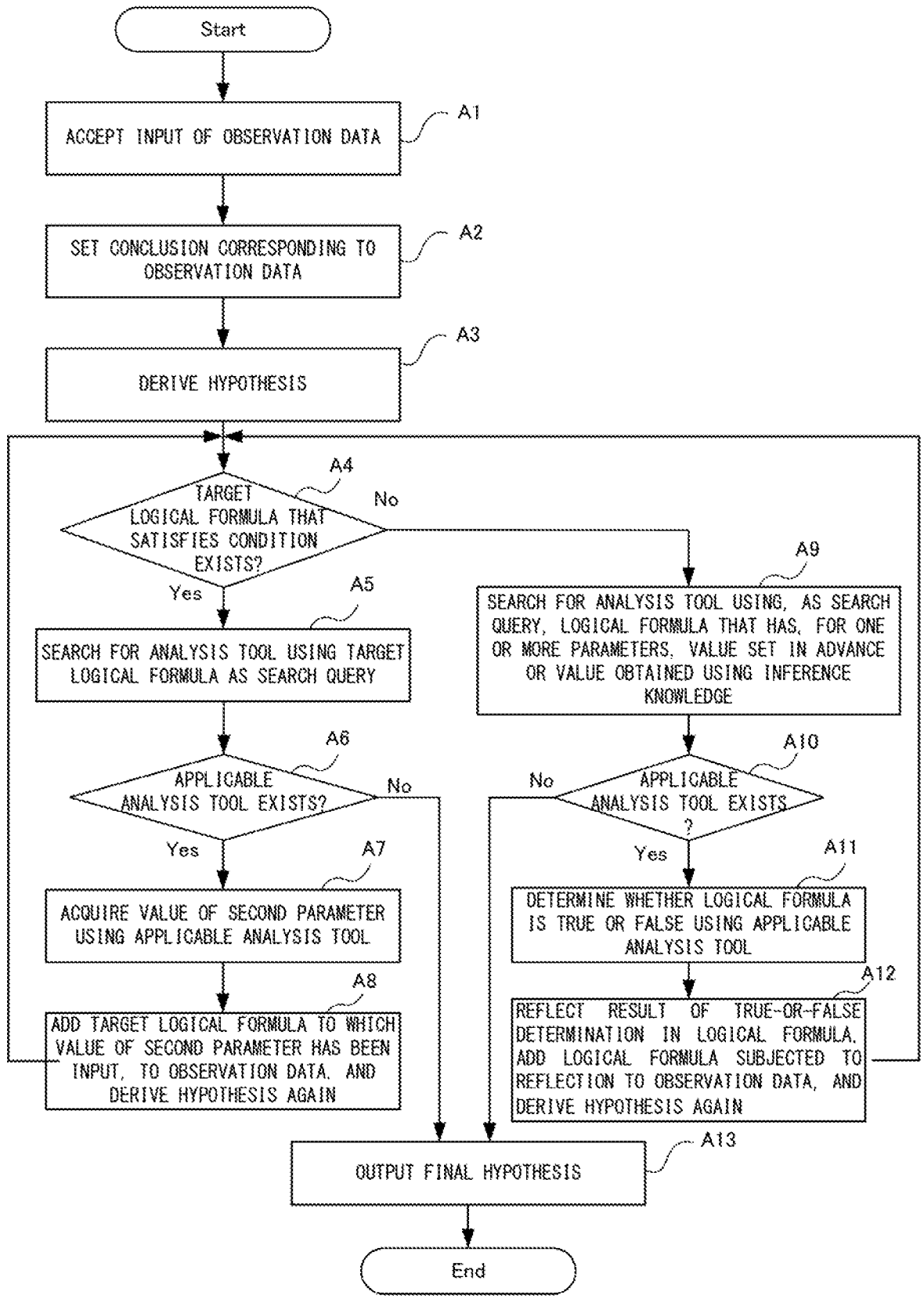
FIG. 5 is a flowchart showing operations of the hypothesis verification apparatus in an example embodiment of the invention.

Next, operations of the hypothesis verification apparatus 10 in an example embodiment of the invention will be described with reference to FIG. 5. FIG. 5 is a flowchart showing operations of the hypothesis verification apparatus in an example embodiment of the invention. The following description references FIGS. 1 to 4 as appropriate. In addition, in this example embodiment, a hypothesis verification method is implemented by causing the hypothesis verification apparatus 10 to operate. Accordingly, the following description of operations of the hypothesis verification apparatus will substitute for a description of a hypothesis verification method according to this example embodiment.

As shown in FIG. 5, the input acceptance unit 13 first accepts input of observation data from the outside (step A1). The input acceptance unit 13 passes the accepted observation data to the conclusion setting unit 14.

Next, the conclusion setting unit 14 collates the observation data using the conclusion storage unit 15 (see FIG. 3), and sets a conclusion corresponding to the observation data (step A2).

Next, the hypothesis generation unit 11 performs abductive inference using the observation data, the conclusion set by the conclusion setting unit 14, and inference knowledge stored in the inference knowledge storage unit 16, and derives a hypothesis (step A3).

Next, the hypothesis verification unit 12 determines whether or not logical formulas that make up the hypothesis include a logical formula (target logical formula) that has two or more parameters of which only one or more parameters (first parameter) have a value (step A4).

As a result of the determination in step A4, if there is a target logical formula that satisfies the condition, the hypothesis verification unit 12 executes search processing on analysis tools registered by the data analysis unit 17, using the target logical formula that satisfies the condition as a search query (step A5).

Next, the hypothesis verification unit 12 determines whether or not an applicable analysis tool was retrieved by executing step A5 (step A6). As a result of the determination in step A6, if no applicable analysis tool was retrieved, the hypothesis verification unit 12 executes step A13.

On the other hand, as a result of the determination in step A6, if such an analysis tool was retrieved, the hypothesis verification unit 12 causes the data analysis unit 17 to execute the retrieved analysis tool, and acquires the value of a second parameter from the value of a first parameter of the target logical formula (step A7).

Next, after execution of step A7, the hypothesis generation unit 11 inputs the value that was be obtained, to the second parameter of the target logical formula, adds the target logical formula to which the value has been input, to the observation data, and derives a hypothesis again from the observation data to which the target logical formula has been added (step A8). After that, step A4 is executed again.

In addition, as a result of the determination in step A4, if there is no target logical formula that satisfies the condition, the hypothesis verification unit 12 executes search processing on the analysis tools registered by the data analysis unit 17 using, as a search query, a logical formula that has, for one or more parameters, a value set in advance or a value obtained using inference knowledge, under the condition that this logical formula exists (step A9).

Next, the hypothesis verification unit 12 determines whether or not an applicable analysis tool was retrieved by executing step A9 (step A10). As a result of the determination in step A10, if no applicable analysis tool was retrieved, the hypothesis verification unit 12 executes step A13.

On the other hand, as a result of the determination in step A10, if an applicable analysis tool was retrieved, the hypothesis verification unit 12 causes the data analysis unit 17 to execute the retrieved analysis tool, and determines whether the logical formula that has, for one or more parameters, a value set in advance or a value obtained using inference knowledge is true or false (step A11).

Next, after executing step A11, the hypothesis verification unit 12 reflects the result of the true-or-false determination in a logical formula targeted for determination, adds the logical formula in which the result of the true-or-false determination is reflected, to the observation data, and derives a hypothesis again from the observation data to which the logical formula has been added (step A12). After that, step A4 is executed again.

In addition, if the determination in step A6 or step A10 is No, the hypothesis generation unit 11 outputs the hypothesis targeted for determination as a final hypothesis (step A13).

Figure 6:
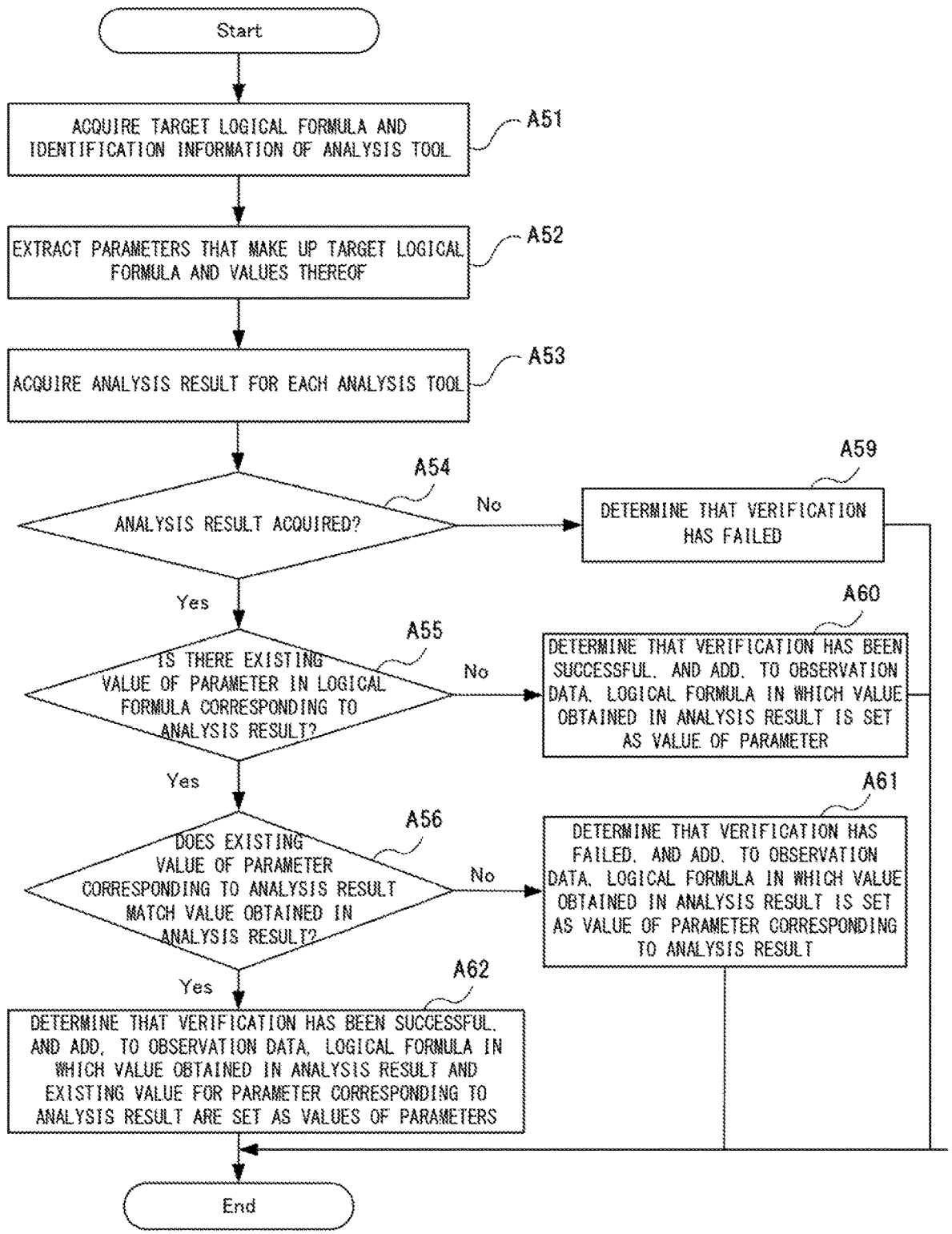
FIG. 6 is a flowchart showing, in more detail, steps A5 and A6 shown in FIG. 5 in an example embodiment of the invention.

Here, steps A5 to A8 shown in FIG. 5 will be described in more detail with reference to FIG. 6. FIG. 6 is a flowchart showing, in more detail, steps A5 to A8 shown in FIG. 5 in an example embodiment of the invention. If processing is executed in accordance with the flow shown in FIG. 6, the data analysis unit 17 can perform analysis in batch processing.

First, as shown in FIG. 6, the data analysis unit 17 acquires a target logical formula (search query) and identification information of an analysis tool specified by the hypothesis verification unit 12 (step A51).

Next, the data analysis unit 17 extracts parameters that make up the target logical formula and values thereof (step A52).

Next, the data analysis unit 17 inputs the name of a corresponding logical formula and the observation data for each analysis tool specified by the hypothesis verification unit 12, executes the analysis tool, and attempts to acquire an analysis result (step A53).

Next, the hypothesis verification unit 12 determines whether or not an analysis result was acquired in step A53 (step A54). As a result of the determination in step A53, if an analysis result was not acquired, the hypothesis verification unit 12 determines that verification failed (step A59). The hypothesis verification unit 12 then outputs the determination to the outside.

On the other hand, as a result of the determination in step A53, if an analysis result was acquired, the hypothesis verification unit 12 determines whether or not there is an existing value of a parameter in a logical formula corresponding to the analysis result (step A55).

As a result of the determination in step A55, if there is no existing value of a parameter in the logical formula corresponding to the analysis result, the hypothesis verification unit 12 determines that verification has been successful. In this case, the hypothesis generation unit adds, to the observation data, the logical formula in which the value obtained in the analysis result is set as the value of the parameter (step A60).

On the other hand, as a result of the determination in step A55, if there is an existing value of the parameter in the logical formula corresponding to the analysis result, the hypothesis verification unit 12 determines whether or not the existing value of the parameter corresponding to the analysis result matches the value obtained in the analysis result (step A56).

As a result of the determination in step A56, if the values do not match, the hypothesis verification unit 12 determines that verification has failed. In this case, the hypothesis generation unit 11 adds, to the observation data, the logical formula in which the value obtained in the analysis result is set as the value of the parameter corresponding to the analysis result (step A61).

On the other hand, as a result of the determination in step A56, if the values match, the hypothesis verification unit determines that verification has been successful. In this case, the hypothesis generation unit 11 adds, to the observation data, the logical formula using the value obtained in the analysis result that is, the existing value for the parameter corresponding to the analysis result as the values of the parameters (step A62).

[Effects of Embodiment]

As described above, according to this example embodiment, hypotheses are verified, and only a fully verified hypothesis is output as a final hypothesis. Accordingly, in this example embodiment, a hypothesis is verified, and is corrected by repeating abductive inference, and thus it is possible to obtain a hypothesis has been verified the most thoroughly based on a fact including observation data and a data analysis result. In addition, in this example embodiment, if all of the constituent elements of a hypothesis are verified, it is possible to obtain a consequence proved based on a fact without requiring manual trial and error.

[Program]

A program according to an example embodiment of the invention may be a program for causing a computer to execute steps A1 to A10 shown in FIG. 5. The hypothesis verification apparatus and the hypothesis verification method in this example embodiment can be realized by installing the program to this computer and executing it. In this case, the processor of the computer functions as, and performs processing as, the hypothesis generation unit 11, the hypothesis verification unit 12, the input acceptance unit 13, the conclusion setting unit 14, and the data analysis unit 17.

In addition, in this example embodiment, the conclusion storage unit 15 and the inference knowledge storage unit 16 can be realized by storing data files that constitute them to a storage device such as a hard disk provided in the computer.

In addition, the program in this example embodiment may also be executed by a computer system constituted by a plurality of computers. In this case, for example, each of the computers may function as one of the hypothesis generation unit 11, the hypothesis verification unit 12, the input acceptance unit 13, the conclusion setting unit 14, and the data analysis unit 17. In addition, the conclusion storage unit 15 and the inference knowledge storage unit 16 may be built on a computer other than the computer that executes the program in this example embodiment.

[Physical Configuration]

Figure 7:
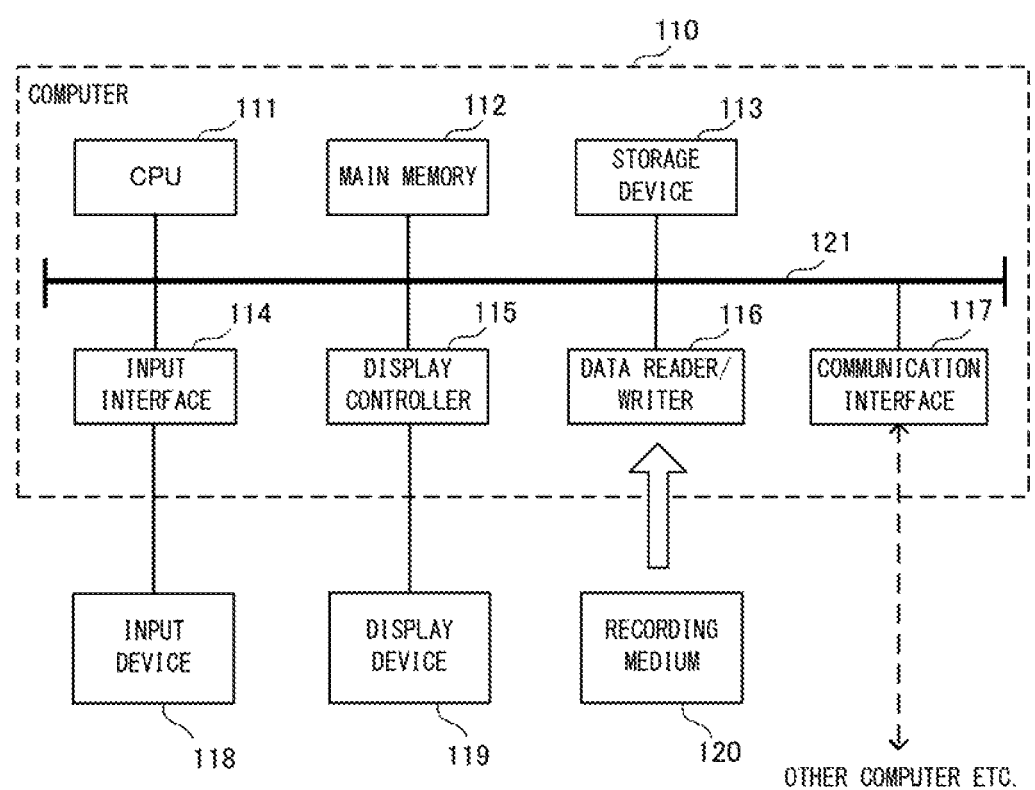
FIG. 7 is a block diagram showing an example of a computer that realizes the hypothesis verification apparatus in an example embodiment of the invention.

Here, a computer that realizes the hypothesis verification apparatus 10 by executing the program of this example embodiment will be described with reference to FIG. 7. FIG. 7 is a block diagram showing an example of the computer that realizes the hypothesis verification apparatus in an example embodiment of the invention.

As shown in FIG. 7, a computer 110 includes a CPU 111, a main memory 112, a storage device 113, an input interface 114, a display controller 115, a data reader/writer 116, and a communication interface 117. These members are connected via a bus 121 to enable the exchange of data therebetween.

The CPU 111 carries out various types of arithmetic calculation by loading the program (code) of this example embodiment, which is stored in the storage device 113, to the main memory 112 and executing portions of the program in a predetermined sequence. The main memory 112 is typically a volatile storage device such as a DRAM (Dynamic Random Access Memory). Also, the program of this example embodiment is provided in a state of being stored on a computer readable recording medium 120. Note that the program in this example embodiment may be distributed on the Internet, which can be accessed via the communication interface 117.

Besides a hard disk drive, other examples of the storage device 113 include a semiconductor storage device such as a flash memory. The input interface 114 mediates the transfer of data between the CPU 111 and input devices 118 such as a keyboard and a mouse. The display controller 115 is connected to a display device 119 and controls display performed by the display device 119.

The data reader/writer 116 mediates the transfer of data between the CPU 111 and the recording medium 120, reads out the program from the recording medium 120, and writes processing results obtained by the computer 110 to the recording medium 120. The communication interface 117 mediates the transfer of data between the CPU 111 and other computers.

Also, specific examples of the recording medium 120 include a general-purpose semiconductor storage device such as a CF (Compact Flash (registered trademark)) and an SD (Secure Digital), a magnetic recording medium such as a flexible disk, and an optical recording media such as a CD-ROM (Compact Disk Read Only Memory).

Note that the hypothesis verification apparatus 10 in this example embodiment can also be realized with use of hardware that corresponds to the above-described units, instead of a computer having the program installed therein. Furthermore, a configuration is possible in which one portion of the hypothesis verification apparatus 10 is realized by a program, and the remaining portion is realized by hardware.

Working Examples

Next, working examples of the hypothesis verification apparatus 10 of the invention will be described with reference to FIGS. 8 to 11. FIGS. 8 to 11 are diagrams showing hypothesis derivation processes in working examples of the invention, and each of the diagrams shows a series of main derivation processes. In addition, in the following description, a case will be described in which the hypothesis verification apparatus 10 is used in data analysis for discovering evidence of a cyberattack, as an example. In addition, the following description references FIGS. 1 to 6 as appropriate.

Figure 8:
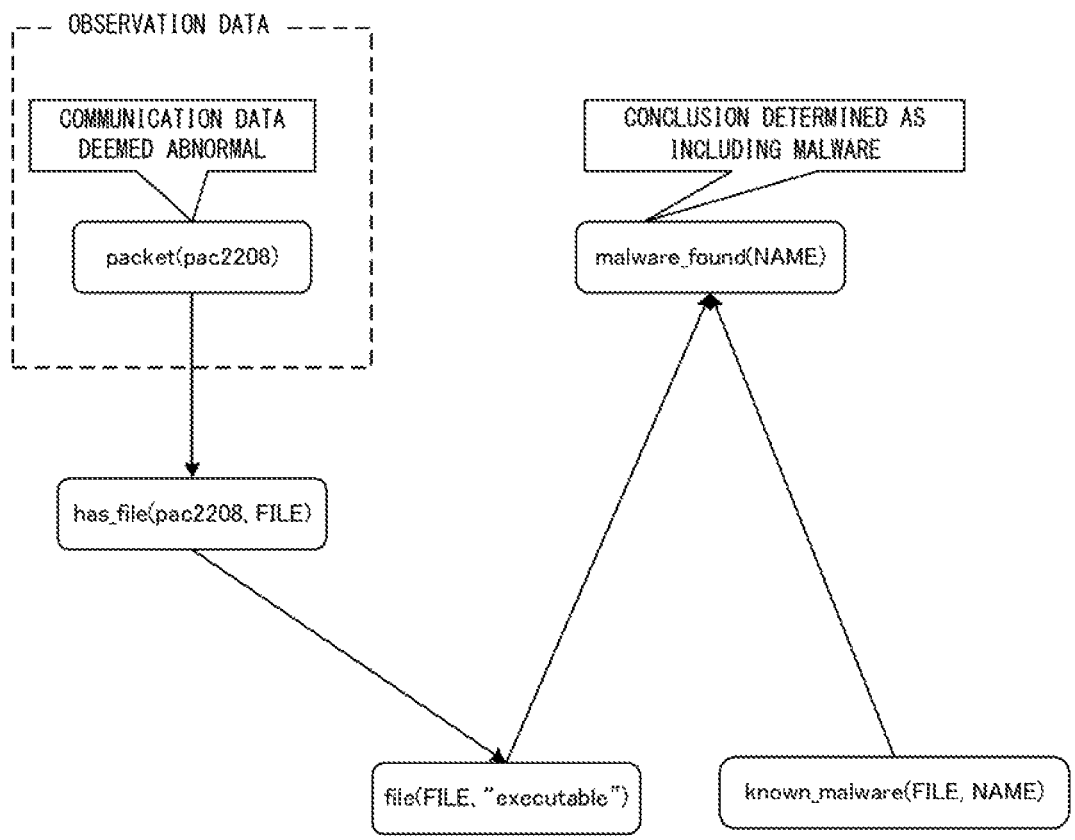
FIG. 8 is a diagram showing a hypothesis derivation process in a working example of the present invention, and the diagram shows a series of main derivation processes.

Assume that, as observation data, communication packet data determined to be abnormal using a tool of IDS (Intrusion Detection System) or SIEM (Security Information and Event Management) is input as a logical formula "packet (pac2208)", as shown in FIG. 8.

"packet (pac2208)" is a logical formula whose predicate name is "packet", and has been obtained by substituting communication packet data with an identification name "pac2208" as a value of the only one parameter into a logical formula "packet (DATA)" that has one parameter (DATA).

In the hypothesis verification apparatus 10, when this observation data is input, the input acceptance unit 13 shown in FIG. 2 accepts the input of the observation data. Accordingly, the conclusion setting unit 14 collates the input observation data using the conclusion storage unit 15, and attempts to acquire a possible conclusion for the observation data. As shown in FIG. 3, the conclusion storage unit 15 stores a pair of logical formulas, namely a logical formula representing a conclusion and one or more logical formulas representing observation data that may lead to the conclusion, which are associated with each other.

In the example in FIG. 8, "malware_found (NAME)" is acquired as a possible conclusion. "malware_found (NAME)" is a logical formula indicating that malware represented as a value of a parameter "NAME" has been found from certain observation data.

The hypothesis generation unit 11 executes abductive inference using "packet (pac2208)" that is initial observation data, "malware_found (NAME)" that is a logical formula indicating a conclusion, and inference knowledge (see FIG. 4) stored in the inference knowledge storage unit 16.

As a result, the hypothesis generation unit 11 generates a hypothesis represented by the entire graph shown in FIG. 8, for example. The example in FIG. 8 shows a result of applying a rule (inference knowledge) on the inference knowledge base that links "packet (pac2208)" and "malware_found (NAME)" to them.

Specifically, the hypothesis generation unit 11 applies the following three pieces of inference knowledge that lead to "malware_found (NAME)" representing a conclusion, in order from the top, from among the pieces of inference knowledge shown in FIG. 4.

file(FILE,"executable")^known_malware(FILE, NAME)→malware_found(NAME), has_file_(DATA,FILE)→file(FILE,"executable"), packet(DATA)→has_file(DATA,FILE)

Next, the hypothesis generation unit 11 substitutes the value of the parameter "pac2208" of the observation data "packet(pac2208)" into the parameter "DATA" in the logical formula "packet(DATA)" that is a portion of the last rule above. Accordingly, the rule "packet(DATA)→has_file (DATA, FILE)" changes to "packet(pac2208)→has_file (pac2208, FILE)". In addition, the value of the parameter "DATA" included in "has_file(DATA,FILE)" in the same rule also changes to "pac2208".

Note that, in the above-described rules, "→" indicates that, if the logical formula on the left side holds true, there is a possibility that the logical formula on the right side holds true, or, if the logical formula on the right side holds true, it may be due to the logical formula on the left side holding true. "^" is a logical operator indicating an AND condition requesting that the logical formulas on both sides hold true.

When the hypothesis shown in FIG. 8 is derived by the hypothesis generation unit 11, the hypothesis verification unit 12 causes the data analysis unit 17 to verify this hypothesis.

The data analysis unit 17 registers a pair of a predicate name of a logical formula and identification information of an analysis tool, and searches an analysis tool database (not illustrated) for an analysis tool based on the predicate name and a characteristic of the value of a parameter that has been input (e.g., file extension). One or more analysis tools are registered in the analysis tool database. Also, the data analysis unit 17 also has the function of executing a retrieved analysis tool.

The hypothesis verification unit 12 detects a logical formula in which only a portion of the parameters has a value (logical formula in which only a first parameter has a value), from among logical formulas that make up the hypothesis. Note that, during detection, when stored in the inference knowledge storage unit 16, a parameter that has a value set in advance can be handled as a parameter that does not have a value.

For example, in FIGS. 4 and 8, "file(FILE,"executable")" includes a parameter "FILE" that does not have a value and a parameter that has a value "executable", but this is not detected as a "logical formula in which a portion of the parameters has a value". Such distinguishing of a hypotheses can be realized by not counting a value of a parameter in double quotation marks as a parameter that has a value, and not assigning double quotation marks to a value obtained from observation data such as "pac2208".

The hypothesis verification unit 12 attempts to acquire a value for a parameter that does not have a value (second parameter) using the data analysis unit 17, regarding a logical formula in which only a portion of the parameters has a value. In the example shown in FIG. 8, only "has_file (pac2208,FILE)" is a logical formula in which only a portion of the parameters has a value. Thus, the data analysis unit 17 acquires the predicate name "has_file" and identification information of an analysis tool (e.g., a file path on which an executable file of the analysis tool is placed) that is paired with the predicate name "has_file", from the analysis tool database.

Here, assume that the logical formula "has_file(DATA, FILE)" is a logical formula indicating that the file "FILE" is included in the communication packet data "DATA", and an analysis tool that is paired with this logical formula is software for extracting a file from data that is the value of "DATA". In this case, the data analysis unit 17 extracts a file from "pac2208" using the analysis tool. The hypothesis verification unit 12 substitutes the identification information of the extracted file as a value of the parameter "FILE" into "has_file(pac2208, FILE)".

For example, assume that a file path on which an open-source packet analysis tool "wireshark" (https://www.wireshark.org/) can be executed is registered in the analysis tool database, as the analysis tool that is paired with "has_file (DATA,FILE)". In this case, the data analysis unit 17 inputs data of pac2208 to wireshark, and executes this packet analysis tool. Accordingly, if there is any file in pac2208, the file is extracted.

For example, if a file named "foo.rar" is extracted from the data of "pac2208", the hypothesis verification unit 12 substitutes the file name of the extracted file into the parameter "FILE" of "has_file(pac2208,FILE)" as identification information. Accordingly, "has_file(pac2208, foo.rar)" is obtained.

Figure 9:
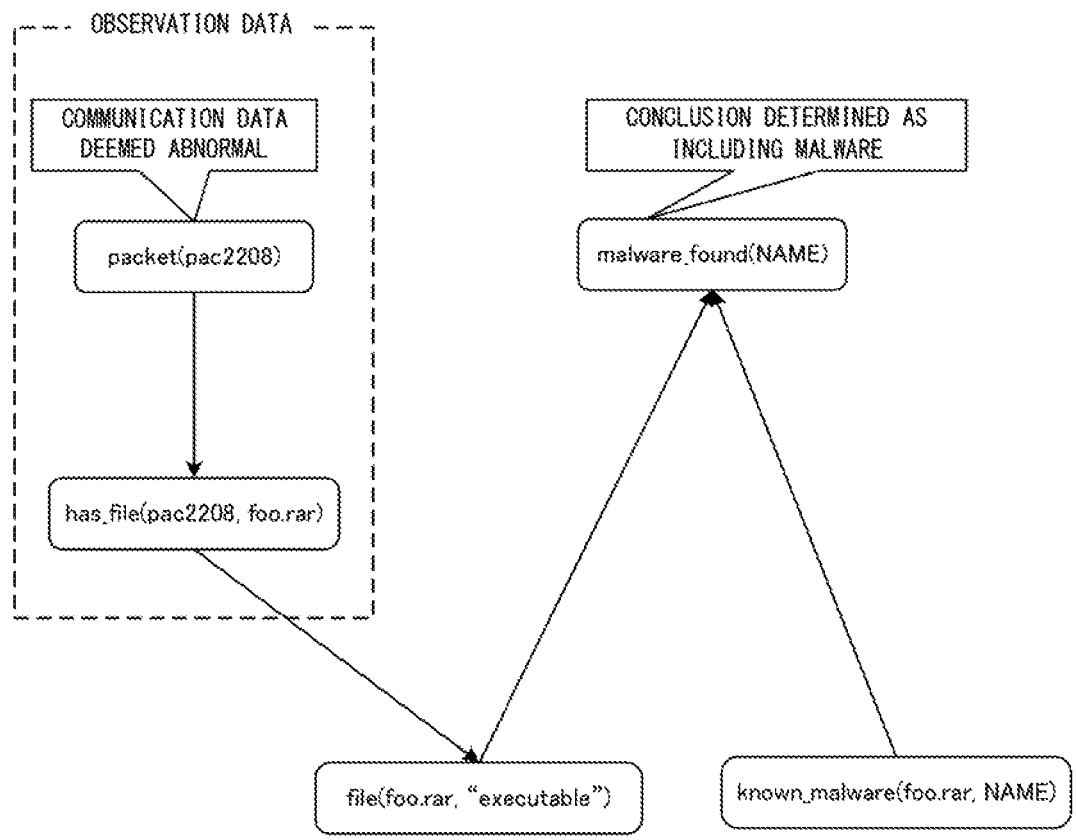
FIG. 9 is a diagram showing a hypothesis derivation process in a working example of the present invention, and the diagram shows a series of main derivation processes.

Next, the hypothesis generation unit 11 generates a hypothesis again using the obtained "has_file(pac2208, foo.rar)" as additional observation data. Accordingly, the hypothesis is updated as shown in FIG. 9. Specifically, in "file(FILE,"executable")" in FIG. 8, the value of the parameter "foo.rar" corresponding to "has_file(pac2208,foo.rar)" is substituted into the parameter "FILE", and in FIG. 9, "file(foo.rar,"executable")" is obtained.

However, on the inference knowledge storage unit 16, "file(foo.rar,"executable")" shown in FIG. 9 is not counted as a parameter that has a value "executable" given in advance. Therefore, the hypothesis verification unit 12 acquires the actual value of this parameter using the data analysis unit 17, similarly to above-described "has_file (pac2208,FILE)" (e.g., a file type can be checked by executing a linux "file" command using "foo.rar" as an argument).

As a result, "archive" is obtained as the value of a second parameter of "file(foo.rar, "executable")", and thus the hypothesis generation unit 11 generates a hypothesis again using "file(foo.rar,archive)" in which "archive" is substituted, as additional observation data. Note that, "file(foo.rar, archive)" is inconsistent with "file(foo.rar,"executable")", and thus the hypothesis in FIG. 8 that includes "file(foo.rar, "executable")" is rejected. After that, another new hypothesis shown in FIG. 10 is generated using the inference knowledge shown in FIG. 4.

Figure 10:
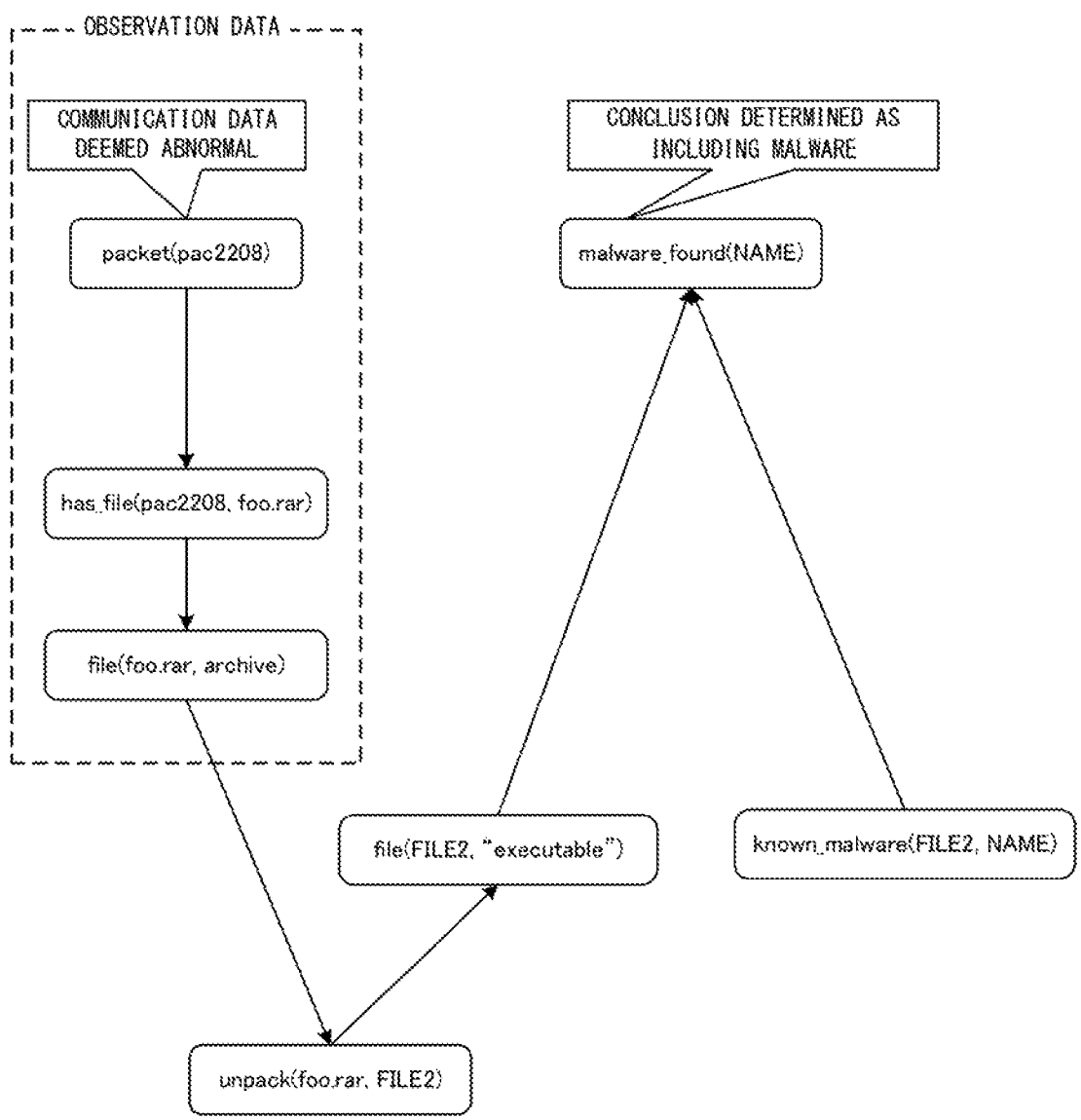
FIG. 10 is a diagram showing a hypothesis derivation process in a working example of the present invention, and the diagram shows a series of main derivation processes.

In the hypothesis shown in FIG. 10, the following rules stored in the inference knowledge storage unit 16 are applied.

has_file(DATA,FILE)→file(FILE,"archive")
file(FILE,"archive")→unpack(FILE,FILE2)
unpack(FILE,FILE2)→file(FILE2,"executable")

From among the above-described rules, logical formulas "has_file(DATA, FILE)" and "file(FILE,"archive")" in the former two rules are respectively replaced with observation data "has_file(pac2208, foo.rar)" and "file(foo.rar,archive)".

In addition, a first parameter "FILE" in a logical formula "known_malware(FILE, NAME)" stored in the inference knowledge storage unit 16 as inference knowledge corresponds to a second parameter "FILE2" of a logical formula "file(FILE, FILE2)" that is paired therewith in FIG. 10, and thus "known_malware(FILE2,NAME)" is obtained. Accordingly, "foo.rar" is substituted into a first parameter of "unpack(FILE, FILE2)", and "unpack(foo.rar, FILE2)" is obtained.

Regarding this "unpack(foo.rar,FILE2)", the data analysis unit 17 analyzes "foo.rar" (in this case, decompresses an archive file) using a corresponding analysis tool (e.g., "rar" of an appropriate version publicly available via http://www.rarlab.com/) similarly to those described above. Accordingly, for example, assume that "foo.exe" is obtained as a second parameter.

In this case, "unpack(foo.rar,foo.exe)" acquired by replacing the value of the second parameter "FILE2" in "unpack (foo.rar,FILE2)" with "foo.exe" is obtained as new additional observation data. Thus, the hypothesis generation unit 11 generates a hypothesis again using the new observation data. Accordingly, a hypothesis in which "unpack(foo.rar, FILE2)", "file(FILE2,"executable")", and "known_malware (FILE2,NAME)" in FIG. 10 are respectively replaced with "unpack(foo. rar, foo. exe)", "file(foo. exe,"executable")", and "known_malware(foo.exe, NAME)" is obtained.

After that, the hypothesis verification unit 12 then causes the data analysis unit 17 to check the file type of "foo.exe" regarding "file(foo.exe,"executable")", and, when a result of "executable" is obtained, acquires additional observation data "file(foo.exe,executable)" as a result that is consistent with "file(foo.exe,"executable")".

In addition, also regarding "known_malware(foo.exe, NAME)", the hypothesis verification unit 12 causes the data analysis unit 17 to execute an analysis tool (e.g., use Web service VirusTotal Public API. https://www.virustotal.com/ja/documentation/public-api/) for checking whether or not "foo.exe" is known malware, and acquires a second parameter.

As a result, the hypothesis verification unit 12 acquires the name of known malware "mal113", and also acquires additional observation data "known malware(foo.exe, mal113)" in which "mal113" is set as the value of "NAME".

Next, the hypothesis generation unit 11 generates a hypothesis again using "file(foo.exe,executable)" and "known_malware(foo.exe,mal113)" as additional observation data. As a result, "mal113" is substituted into the parameter "NAME" in the logical formula "malware_found (NAME)" indicating a conclusion, based on the rule "file (FILE,"executable")^known_malware(FILE,NAME)→malware_found(NAME)" stored in the inference knowledge storage unit 16. Accordingly, new observation data "malware_found (mal113)" is obtained.

Figure 11:
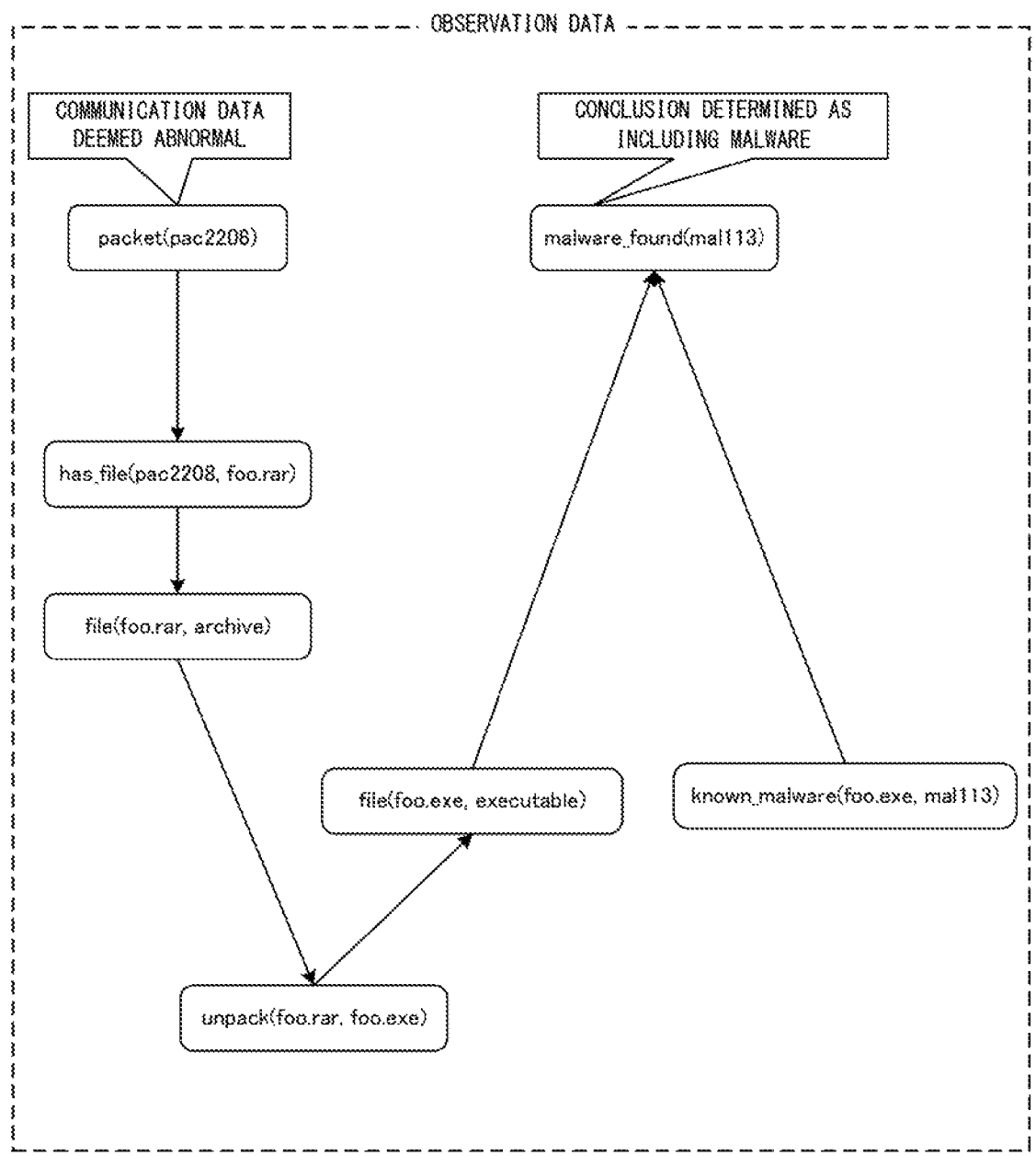
FIG. 11 is a diagram showing a hypothesis derivation process in a working example of the present invention, and the diagram shows a series of main derivation processes.

As a result, as shown in FIG. 11, a proven hypothesis in which all of the logical formulas that make up the hypothesis are constituted by observation data (verified fact) is obtained. In addition, regarding the proved hypothesis shown in FIG. 11, there are no more applicable analysis tools, and thus the hypothesis verification unit 12 outputs this hypothesis as a final hypothesis.

As described above, in this working example, data analysis that is performed in the field of cybersecurity has been described as an example, but application of the present invention application is not limited thereto. The invention can also be similarly applied to discovery of evidence related to accidents or crimes in the real world, analysis of a cause of a certain system failure, and the like using data obtained from various sensors or various types of notifications as observation data.

The example embodiments described above can be partially or entirely realized by Supplementary Notes 1 to 15 listed below, but the invention is not limited to the following descriptions.

(Supplementary Note 1)

A hypothesis verification apparatus including:

a hypothesis generation unit configured to derive, from observation data expressed by a set of logical formulas each including one name and one or more parameters, a hypothesis made up of the logical formulas that lead to a possible conclusion, using knowledge data expressed in the same format as the observation data; and a hypothesis verification unit configured to, if the logical formulas that make up the hypothesis include a logical formula that includes a first parameter that has a value obtained from the observation data and a second parameter that does not have a value obtained from the observation data, set the logical formula as a target logical formula, acquire a value of the second parameter based on the observation data and a name of the target logical formula, and input the obtained value of the second parameter to the target logical formula, and if, conversely, there is no logical formula that is to be set as the target logical formula, and if there is a logical formula that has, for one or more parameters, a value set in advance or a value obtained using inference knowledge, determine whether this logical formula is true or false, wherein, when determination is performed as to whether the logical formula is true or false, or, when the value of the second parameter is input to the target logical formula, the hypothesis generation unit adds the logical formula subjected to true-or-false determination or the target logical formula to the observation data, and derives a hypothesis again.

(Supplementary Note 2)

The hypothesis verification apparatus according to Supplementary Note 1, wherein the observation data is data having a format of a logical formula, the hypothesis verification apparatus further includes a data analysis unit configured to register a name of each of a plurality of logical formulas and an analysis tool that can extract a value of a parameter included in the logical formula in association with the logical formula, and when a name of a logical formula and data included in the logical formula are input, execute the analysis tool according to the input, and the hypothesis verification unit performs the true-or-false determination or acquires the value of the second parameter by inputting, to the data analysis unit, the observation data and a name of a logical formula, or the value of the first parameter and a name of a logical formula.

(Supplementary Note 3)

The hypothesis verification apparatus according to Supplementary Note 2, wherein the hypothesis verification apparatus further includes a conclusion setting unit configured to set a conclusion corresponding to the observation data by collating the observation data with a database in which a conclusion is registered in advance for each logical formula.

(Supplementary Note 4)

A hypothesis verification method including:

(a) a step of deriving, from observation data expressed by a set of logical formulas each including one name and one or more parameters, a hypothesis made up of the logical formulas that lead to a possible conclusion, using knowledge data expressed in the same format as the observation data;

(b) a step of, if the logical formulas that make up the hypothesis include a logical formula that includes a first parameter that has a value obtained from the observation data and a second parameter that does not have a value obtained from the observation data, setting the logical formula as a target logical formula, acquiring a value of the second parameter based on the observation data and a name of the target logical formula, and inputting the obtained value of the second parameter to the target logical formula, and if, conversely, there is no logical formula that is to be set as the target logical formula, and if there is a logical formula that has, for one or more parameters, a value set in advance or a value obtained using inference knowledge, determining whether this logical formula is true or false; and (c) a step of, when determination as to whether the logical formula is true or false is performed, or, when the value of the second parameter is input to the target logical formula, adding the logical formula subjected to trueor-false determination or the target logical formula to the observation data, and deriving a hypothesis again.

(Supplementary Note 5)

The hypothesis verification method according to Supplementary Note 4,
wherein the observation data is data having a format of a logical formula, and
in the (b) step,
using an analysis tool that is registered in association with a name of a logical formula, and can extract a value of a parameter included in the logical formula, the true-or-false determination is performed or the value of the second parameter is acquired by inputting, to the analysis tool, the observation data and a name of a logical formula, or the value of the first parameter and a name of a logical formula.

(Supplementary Note 6)

The hypothesis verification method according to Supplementary Note 5, further including
(d) a step of setting a conclusion corresponding to the observation data by collating the observation data with a database in which a conclusion is registered in advance for each logical formula.

(Supplementary Note 7)

A computer-readable recording medium that includes a program recorded thereon, the program including instructions that cause a computer to carry out:
(a) a step of deriving, from observation data expressed by a set of logical formulas each including one name and one or more parameters, a hypothesis made up of the logical formulas that lead to a possible conclusion, using knowledge data expressed in the same format as the observation data;
(b) a step of, if the logical formulas that make up the hypothesis include a logical formula that includes a first parameter that has a value obtained from the observation data and a second parameter that does not have a value obtained from the observation data, setting the logical formula as a target logical formula, acquiring a value of the second parameter based on the observation data and a name of the target logical formula, and inputting the obtained value of the second parameter to the target logical formula, and
if, conversely, there is no logical formula that is to be set as the target logical formula, and if there is a logical formula that has, for one or more parameters, a value set in advance or a value obtained using inference knowledge, determining whether this logical formula is true or false; and
(c) a step of, when determination as to whether the logical formula is true or false is performed, or, when the value of the second parameter is input to the target logical formula, adding the logical formula subjected to true-or-false determination or the target logical formula to the observation data, and deriving a hypothesis again.

(Supplementary Note 8)

The computer-readable recording medium according to Supplementary Note 7,
wherein the observation data is data having a format of a logical formula, and
in the (b) step,
using an analysis tool that is registered in association with a name of a logical formula, and can extract a value of a parameter included in the logical formula, the true-or-false determination is performed or the value of the second parameter is acquired by inputting, to the analysis tool, the observation data and a name of a logical formula, or the value of the first parameter and a name of a logical formula.

(Supplementary Note 9)

The computer-readable recording medium according to Supplementary Note 8,
wherein the program further includes instructions that cause a computer to carry out:
(d) a step of setting a conclusion corresponding to the observation data by collating the observation data with a database in which a conclusion is registered in advance for each logical formula.

Although the present invention has been described above with reference to the example embodiments above, the invention is not limited to the above example embodiments. Various modifications understandable to a person skilled in the art can be made to configurations and details of the invention, within the scope of the invention.

INDUSTRIAL APPLICABILITY

As described above, according to the present invention, a hypothesis can be verified, and can be corrected based on the verification result. The present invention is useful to improve the efficiency of work for clarifying situations such as accidents, crimes, and cyberattacks, or causes of such situations. Similarly, the present invention is also useful for analyzing the causes for and considering measures against disasters and system failures.

LIST OF REFERENCE SIGNS

10 Hypothesis verification apparatus
11 Hypothesis generation unit
12 Hypothesis verification unit
13 Input acceptance unit
14 Conclusion setting unit
15 Conclusion storage unit
16 Inference knowledge storage unit
17 Data analysis unit
110 Computer
111 CPU
112 Main memory
113 Storage device
114 Input interface
115 Display controller
116 Data reader/writer
117 Communication interface
118 Input device
119 Display apparatus
120 Recording medium
121 Bus

The invention claimed is:

1. A hypothesis verification apparatus comprising:
one or more processors; and
a memory storing instructions executable by the one or more processors to:
derive, from observation data expressed by a set of logical formulas that each include a name and one or more parameters, a hypothesis made up of the logical formulas that lead to a possible conclusion, using knowledge data expressed in a same format as the observation data, the name of each logical formula registered in associated with an analysis tool that is configured to extract the value of the one or more parameters included in the logical formula;

in response to determining that the logical formulas that make up the hypothesis include a first logical formula including a first parameter that has a value obtained from the observation data and a second parameter that does not have a value obtained from the observation data, set the first logical formula as a target logical formula, acquire a value of the second parameter based on the observation data and a name of the target logical formula, input the obtained value of the second parameter to the target logical formula, set the target logical formula as a search query, and perform search processing on the analysis tool associated with the target logical formula using the search query;

in response to determining there is no first logical formula within the logical formulas that make up the hypothesis that include the first parameter and the second parameter, and in response to determining that the logical formulas that make up the hypothesis include a second a logical formula of which the one or more parameters have a value set in advance or a value obtained using inference knowledge, determine whether the second logical formula is true or false; and in response to input of a name of a third logical formula and the observation data or the value of the first parameter, accordingly execute the analysis tool associated with the third logical formula, wherein, when the second logical formula is determined to be true or false, or when the obtained value of the second parameter is input to the target logical formula, add the second logical formula or the target logical formula to the observation data, and again derive the hypothesis.

2. The hypothesis verification apparatus according to claim 1, wherein the observation data has a same format as the logical formulas, and the instructions are executable by the one or more processor to further register the name of each logical formula and the analysis tool associated therewith.

3. The hypothesis verification apparatus according to claim 2, wherein the instructions are executable by the one or more processors to further set a specified conclusion corresponding to the observation data by collating the observation data with a database in which a conclusion is registered in advance for each logical formula.

4. A hypothesis verification method comprising:

deriving, by a processor and from observation data expressed by a set of logical formulas that each include a name and one or more parameters, a hypothesis made up of the logical formulas that lead to a possible conclusion, using knowledge data expressed in a same format as the observation data, the name of each logical formula registered in associated with an analysis tool that is configured to extract the value of the one or more parameters included in the logical formula;

in response to determining that the logical formulas that make up the hypothesis include a first logical formula including a first parameter that has a value obtained from the observation data and a second parameter that does not have a value obtained from the observation data, setting, by the processor, the first logical formula as a target logical formula, acquiring a value of the second parameter based on the observation data and a name of the target logical formula, inputting, by the processor, the obtained value of the second parameter to the target logical formula, setting, by the processor, the target logical formula as a search query, and performing, by the processor, search processing on the analysis tool associated with the target logical formula using the search query;

in response to determining there is no first logical formula within the logical formulas that make up the hypothesis that include the first parameter and the second parameter, and in response to determining that the logical formulas that make up the hypothesis include a second a logical formula of which the one or more parameters have a value set in advance or a value obtained using inference knowledge, determining, by the processor, whether the second logical formula is true or false; and in response to input of a name of a third logical formula and the observation data or the value of the first parameter, accordingly executing, by the processor, the analysis tool associated with the third logical formula, when the second logical formula is determined to be true or false, or when the obtained value of the second parameter is input to the target logical formula, adding, by the processor, the second logical formula or the target logical formula to the observation data, and again deriving, by the processor, the hypothesis.

5. The hypothesis verification method according to claim 4, wherein the observation data has a same format as the logical formulas, and the method further comprises registering, by the processor, the name of logical formula and the analysis tool associated therewith.

6. The hypothesis verification method according to claim 5, further comprising:

setting, by the processor, a specified conclusion corresponding to the observation data by collating the observation data with a database in which a conclusion is registered in advance for each logical formula.

7. A non-transitory computer-readable recording medium that includes a program recorded thereon, the program including instructions that when executed by a computer cause the computer to carry out:

(a) a step of deriving, and from observation data expressed by a set of logical formulas that each include a name and one or more parameters, a hypothesis made up of the logical formulas that lead to a possible conclusion, using knowledge data expressed in a same format as the observation data, the name of each logical formula registered in associated with an analysis tool that is configured to extract the value of the one or more parameters included in the logical formula;

in response to determining that the logical formulas that make up the hypothesis include a first logical formula including a first parameter that has a value obtained from the observation data and a second parameter that does not have a value obtained from the observation data, setting the first logical formula as a target logical formula, acquiring a value of the second parameter based on the observation data and a name of the target logical formula, inputting the obtained value of the second parameter to the target logical formula, setting the target logical formula as a search query, and performing search processing on the analysis tool associated with the target logical formula using the search query;

in response to determining there is no first logical formula within the logical formulas that make up the hypothesis that include the first parameter and the second parameter, and in response to determining that the logical formulas that make up the hypothesis include a second a logical formula of which the one or more parameters have a value set in advance or a value obtained using inference knowledge, determining whether the second logical formula is true or false; and in response to input of a name of a third logical formula and the observation data or the value of the first parameter, accordingly executing the analysis tool associated with the third logical formula, when the second logical formula is determined to be true or false, or when the obtained value of the second parameter is input to the target logical formula, adding the second logical formula or the target logical formula to the observation data, and again deriving the hypothesis.

8. The non-transitory computer-readable recording medium according to claim 7, wherein the observation data has a same format as the logical formulas, and the instructions when executed by the computer cause the computer to further carry out registering the name of logical formula and the analysis tool associated therewith.

9. The non-transitory computer-readable recording medium according to claim 8, wherein the instructions when executed by the computer cause the computer to further carry out:

setting a specified conclusion corresponding to the observation data by collating the observation data with a database in which a conclusion is registered in advance for each logical formula.

\* \* \* \* \*